US012807314B2

(12) United States Patent
Robinson et al.

(10) Patent No.: US 12,807,314 B2
(45) Date of Patent: Nov. 24, 2026

(54) AIRCRAFT SEAT

(71) Applicant: Textron Aviation Inc., Wichita, KS (US)

(72) Inventors: Michael Scott Robinson, Cheney, KS (US); David Wayne Davis, Wichita, KS (US); Jason Michael Decker, Wichita, KS (US); Frank Joseph Rowe, Wichita, KS (US); Merril Binford Williams, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 107 days.

(21) Appl. No.: 18/752,485

(22) Filed: Jun. 24, 2024

(65) Prior Publication Data

US 2025/0388324 A1 Dec. 25, 2025

(51) Int. Cl.
*B64D 11/06* (2006.01)

(52) U.S. Cl.
CPC ...... *B64D 11/064* (2014.12); *B64D 11/06395* (2014.12); *B64D 11/0643* (2014.12); *B64D 11/0644* (2014.12); *B64D 11/0696* (2013.01)

(58) Field of Classification Search
CPC . B60N 2/02; B60N 2/22; B60N 2/995; B64D 11/06395; B64D 11/064; B64D 11/0641; B64D 11/0643; B64D 11/0644
See application file for complete search history.

(56) References Cited

U.S. PATENT DOCUMENTS 8,276,845 B2 10/2012 Orgerie et al.
8,757,714 B2 6/2014 Ward et al.
9,033,284 B2 5/2015 Van Staagen
9,051,053 B2 6/2015 Ward et al.
10,266,270 B2 4/2019 Becker et al.
(Continued)

FOREIGN PATENT DOCUMENTS

| | | | | |
|---|---|---|---|---|
| CN | 103182969 A | 7/2013 | | |
| DE | 102023120202 A1 * | 2/2024 | ........... | B60N 2/0292 |
| GB | 2560996 A * | 10/2018 | ............. | B60N 2/995 |

OTHER PUBLICATIONS

NASA Standards Inform Comfortable Car Seats, NASA Spinoff, published 2013, https://spinoff.nasa.gov/Spinoff2013/t_4.html, retrieved from the internet Jun. 18, 2024.

*Primary Examiner* — Alfred J Wujciak
(74) *Attorney, Agent, or Firm* — Avek IP, LLC

(57) ABSTRACT

Contemporary aircraft seats are often designed to meet specifications regarding safety and flightworthiness without much consideration for occupant comfort. The aircraft seats disclosed are designed to achieve a high level of occupant comfort while maintaining a simple, symmetrical, and lightweight construction. The seat comprises a mechanism with an actuator that can reconfigure the seat in TTOL, Task, Enhanced, Zero-G, and Slumber positions that each suit different activities a crew member or passenger may undertake while aboard an aircraft. At least one of the positions supports a neutral body posture, and the chair is thoroughly outfitted with rigid supports, comfortable padding, and a design contoured to the human body to maximize comfort. The seat can be configured with a control mechanism that may allow users to adjust the position of the seat via a mobile device or a control panel configured on the seat.

14 Claims, 12 Drawing Sheets

(56) References Cited

U.S. PATENT DOCUMENTS

| | | | | |
|---|---|---|---|---|
| D848,167 | S | 5/2019 | Rowe et al. | |
| 10,308,363 | B2 | 6/2019 | Ward | |
| D857,413 | S | 8/2019 | Rowe et al. | |
| 10,596,926 | B2 | 3/2020 | Last et al. | |
| 10,683,100 | B2 | 6/2020 | Bilbrey et al. | |
| 10,689,120 | B2 | 6/2020 | Phi | |
| 10,787,262 | B2 | 9/2020 | Ward | |
| D949,613 | S | 4/2022 | Rowe et al. | |
| 11,401,038 | B1 * | 8/2022 | Warwick .............. | B64D 11/064 |
| 11,459,109 | B2 | 10/2022 | Hoover et al. | |
| 11,472,558 | B2 | 10/2022 | Fagan et al. | |
| 11,498,685 | B2 | 11/2022 | Hoover et al. | |
| 11,571,995 | B2 | 2/2023 | Last | |
| 11,685,530 | B1 | 6/2023 | Fagan et al. | |
| 11,713,124 | B2 | 8/2023 | Ward | |
| 11,772,532 | B1 * | 10/2023 | Lovett ...................... | B60N 2/70<br>297/452.41 |
| 11,827,361 | B2 | 11/2023 | Warren et al. | |
| 11,833,930 | B2 | 12/2023 | Ormerod | |
| 11,912,415 | B2 | 2/2024 | Thisius et al. | |
| 11,999,271 | B2 | 6/2024 | Ward | |
| 2022/0315225 | A1 | 10/2022 | Fagan et al. | |
| 2023/0115357 | A1 | 4/2023 | Ward et al. | |
| 2023/0406511 | A1 * | 12/2023 | OHara ..................... | B60N 2/66 |

* cited by examiner

AIRCRAFT SEAT

BACKGROUND OF THE INVENTION

1. Field

The disclosed embodiments relate generally to the field of aviation seating, and more specifically to zero-gravity position seating.

2. Description of the Related Art

The neutral body posture ("NBP"), or the natural posture the human body assumes when exposed to microgravity, is well-known within the field of aerospace due to its importance to astronauts spending extended periods of time in microgravity. U.S. Pat. No. 8,276,845 to Orgerie et al. discloses an aircraft pilot seat and reasons for ergonomic designs for pilot comfort, including various adjustments that can be made to the pilot seat and armrest. U.S. Pat. No. 9,033,284 to Van Staagen discloses a pilot seat with adjustable features including an adjustable armrest. U.S. Pat. No. 10,683,100 to Bilbrey et al. discloses a pilot seat with integrated controls and an armrest that may be contoured with the pilot seat. U.S. Pat. Nos. 11,459,109 and 11,498,685, both to Hoover et al., disclose a pilot seat with an automatic side-stick armrest.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In embodiments of the present disclosure, an adjustable aircraft seat includes: a plurality of contoured seat components including a seat bottom, a seat back, a leg rest, and armrests, wherein each component of the plurality includes a cushioned portion mounted on a base portion; a frame configured to support the seat bottom, seat back, leg rest, and armrests via each respective base portion; a motor mounted on the frame; and a mechanical linkage operatively coupling the motor with components of the frame such that operation of the motor moves the seat bottom, seat back, leg rest and armrests simultaneously, wherein adjustment of the aircraft seat by the motor occurs through a single joint pivotally coupled to the mechanical linkage.

In embodiments of the present disclosure, a crew seat adjustment system includes: a frame including a pair of rigid trusses, wherein the pair of trusses are arranged substantially parallel with one another; a frame arm linked to the frame at a joint such that the frame arm is pivotable relative to the frame while the frame remains static; a first mechanical linkage including two branches of arms linked at a plurality of joints, wherein one branch includes the frame arm and whereby pivoting the frame arm extends the mechanical linkage; and a second mechanical linkage with a platform and a spine, wherein the second mechanical linkage is configured to pitch the platform up and pivot the frame arm upon reclining of the spine.

In embodiments of the present disclosure, a method for adjusting a crew seat into a plurality of positions includes: defining a plurality of seating positions on a control surface, including a TTOL, Task, Enhanced, Zero-G, and Slumber position, wherein the seating positions may be assumed by a crew seat with a rigid frame; providing an instruction from the control surface to an electric actuator configured to extend a first mechanical linkage and to raise a second mechanical linkage; raising a leg rest upward and outward by extending the first mechanical linkage; dropping a rear portion of a seat bottom by raising the second mechanical linkage; and reclining a seat back by raising the second mechanical linkage.

BRIEF DESCRIPTION OF SEVERAL VIEWS OF THE DRAWINGS

Illustrative embodiments are described in detail below with reference to the attached drawing figures, which are incorporated by reference herein and wherein.

Figure 1A:
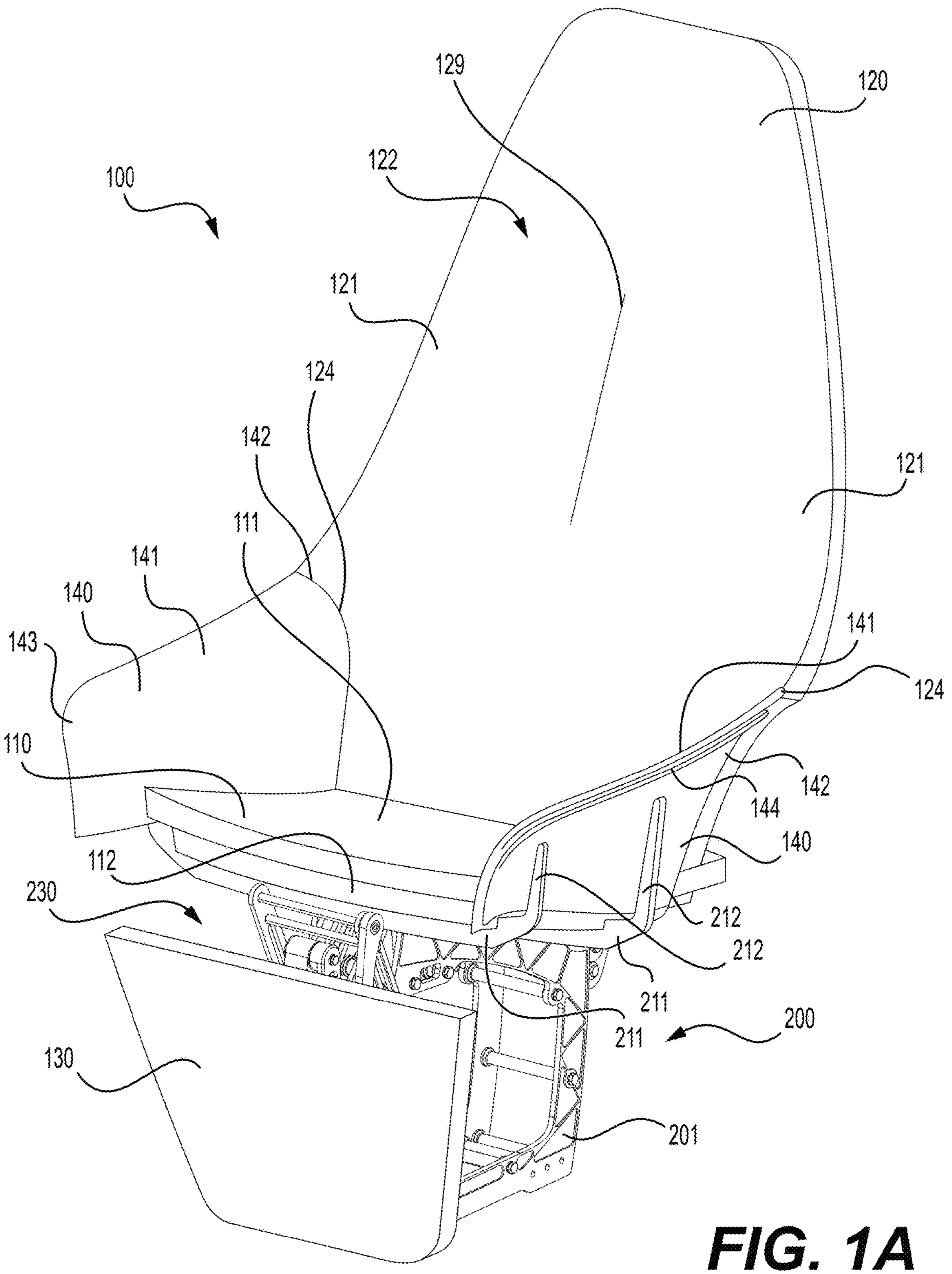
FIG. 1A gives a view of a zero-gravity crew seat configured in a taxi, takeoff, and landing ("TTOL") position, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to “one embodiment,” “an embodiment,” or “embodiments” mean that the feature or features being referred to are included in at least one embodiment of the technology. Separate references to “one embodiment,” “an embodiment,” or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Existing aviation seating mechanisms must meet numerous certifications given that aviation seats are considered the first and best life-saving device for pilots and passengers on board aircraft. Designs for seats compliant with these certifications often come with a high part count which drives up the weight and cost for the seats and any aircraft they are installed on. Moreover, when seats conform to this traditional seat structure design, a lack of human-centric design in favor of safe design becomes apparent. This means that a modern aircraft seat is more of a system of mechanical features with added pads and upholstery systems placed on top instead of a seat designed to be in sync with an occupant’s movements and positioning.

Additionally, the tasks of aircraft occupants may not all be conducive to the same seat positioning. The human body typically wants to be at a relaxed position that can be described by a set of angularity metrics when not subjected to physical inputs like gravity and/or being contingent to padding assemblies, but the dynamic nature of aircraft and spacecraft flight means that a single seat positioning is unlikely to be suitable during all times of the flight.

Disclosed herein are embodiments of an aircraft crew seat that may be configured into a variety of seating positions, including a “Task” position; an “Enhanced” position; a taxi, takeoff, and landing (hereinafter “TTOL”) position; a “Slumber” position; and a neutral-body or “zero-G” position. The seat comprises an underlying mechanism which is configured to move a set of support assemblies in accordance with a human body’s biomechanical structure, specifically in accordance with the legs, spine, and allocation of disruption with the head and neck. This mechanism is driven by a minimal amount of electric actuation such that the system may be configured into at least the five positions disclosed. A controller may be configured on the mechanism to allow the user to adjust the seat by interacting with the controller or via a mobile device connected to the controller.

Exemplary seat positions include, but are not limited to the following: sitting upright with no back support for doing task items like dining or working (“Task”), sitting in a safe position for taxi, takeoff and landing (“TTOL”), relaxing with less pressure on thighs and some additional back support for reading or viewing media (“Enhanced”), a no-stress position with even pressure distribution on legs/back/head to emulate neutral body posture (“Zero-G”), and a position for feet/heart/head to lie on a similar plane akin to a sleeping or slumber-friendly posture (“Slumber”).

When the seat is adjusted between positions, a leg rest rises while a seat back reclines via a single linked mechanism. Instead of sliding along one or more rails as with a typical seat pan, the seat is configured to pitch up and down, wherein a front portion of the seat may rise while a rear portion of the seat drops, lowers, or remains static. The lack of any rails reduces the footprint of the seat by providing adjustment from a single position. In embodiments, the leg rest and seat back may be adjusted separately to allow an occupant to customize the seating arrangement.

Additional measures to maximize occupant comfort include a contoured seat designed to envelop a seated occupant such that pressure is evenly distributed across the chair, thereby preventing occupant soreness from extended seating and eliminating stress points. Contours along the edge of the seat and the comprehensive seat design may be configured to give the seat a futuristic, luxurious, and appealing aesthetic. A symmetric design to the seat also contributes to a pleasing aesthetic and simplifies seat construction by employing common parts between the left and right sides of the seat. Embodiments may comprise a relief cutout in the seat back and seat bottom intended to accommodate an occupant’s spine to further optimize the distribution of pressure on an occupant. Memory foam, upholstery, cushioning, and other comfortable fabrics, composites, and materials may be employed on the seat to further assist in pressure distribution.

The Task position is separate from the TTOL, Enhanced, Zero-G, and Slumber positions. It allows for the occupant to adjust overall angularity up and forward, which may be desirable for an occupant seated at a table or viewing a screen fixed elsewhere on an aircraft. In embodiments, the Task position can be adjusted with non-discrete continuous motion along 10 degrees of actuation. For instance, the seat can be adjusted to the Zero-G position, then up to 10 degrees of forward angle can be applied.

To maintain a lightweight and simple design, a minimal number of components are used in construction of the seat. Components may comprise composite materials such as carbon fiber to achieve a lightweight, rigid, and durable construction. A single electric actuator may be employed, and control of seat movement and position may be by a controller located within the seat remotely (e.g., from a mobile device).

Referring now to FIG. 1A, a crew seat 100 in the “TTOL” position comprises a seat bottom 110, a seat back 120, a leg rest 130, armrests 140, and a frame 200. Crew seat 100 may be a bucket seat suitable for seating a single individual on an aircraft. Each of seat bottom 110, seat back 120, leg rest 130, and armrests 140 may be configured on frame 200 via screws, glue, or other mounting means. To allow for adjustable seating positions on crew seat 100, frame 200 may comprise a plurality of mechanical linkages, such as mechanical linkage 230, that permit the reconfiguration of seat bottom 110, seat back 120, leg rest 130, and armrests 140 to support a variety of seating postures. In some embodiments, the mechanical linkages move in tandem, while multiple independently-moving linkages may be used in other embodiments. The overall design of crew seat 100 may also be substantially symmetrical in embodiments to increase the aesthetic appeal of crew seat 100 and to reduce the design complexity and number of unique parts required for seat construction. This is in contrast to some aircraft seats that are configured for being situated on the left or right side of an aircraft (e.g., across the aisle from one another), where the shape of the seat is configured for fitting adjacent a fuselage wall on an outboard side and configured for extending over the aisle on an inboard side. The design of crew seat 100 from a seated occupant’s left may be substantially similar via mirror symmetry to the design of crew seat 100 to the occupant’s right such that left and right components of crew seat 100 may be indistinguishable to one another.

Additionally, crew seat 100 may comprise a plurality of lightweight rigid components such that crew seat 100 resists deformation and maintains the shape of its parts while remaining reconfigurable into a plurality of positions without introducing excess weight to an aircraft.

Seat bottom 110 provides a comfortable material and cushioning for sitting upon. A base portion 112 of seat bottom 110 may be rigid to maintain the shape of seat bottom 110 while an occupant is seated and as crew seat 100 is reconfigured, and a cushion 111 is disposed on top of seat bottom 110 for occupant comfort. Cushion 111 may also be contoured to match the shape of an occupant's legs and may contain a relief to house the base of an occupant's spine. Cushion 111 and other cushions configured on crew seat 100 may comprise memory foam to accommodate the unique shape of any seated user without compromising the aesthetic of crew seat 100. Seat bottom 110 may be mounted to frame 200 via brackets 211, wherein each bracket 211 comprises a rigid frame component suitable for holding seat bottom 110 secure in a plurality of seating positions of crew seat 100. When crew seat 100 is reconfigured in a different position, seat bottom 110 may be pitched upwards or downwards or pivoted via a mechanical linkage included in frame 200 such as mechanical linkage 230. An adjustment of the pitch of seat bottom 110 may comprise raising a front portion of seat bottom 110 while dropping or keeping static a rear portion of seat bottom 110.

Seat back 120 comprises a backrest with wings 121, contour 122, and grooves 124. Wings 121 are cushioned outward extensions of seat back 120 that provide a region configured to support an occupant's elbows and upper arms when an occupant rests their arms on armrests 140. Contour 122 comprises the geometry of the portion of seat back 120 on which an occupant may rest their back against and may be shaped to provide lumbar support, back support, and neck support to a seated occupant. Contour 122 may comprise a relief 129 configured to evenly apply pressure to an occupant's spine, or a rigid portion of seat back 120 configured to accommodate an occupant's spine may be configured with relief 129, as further discussed alongside FIG. 1B. Wings 121 and contour 122 may be shaped to conform to the shape of an occupant's torso to increase occupant comfort by evenly distributing pressure and minimizing pressure hotspots for a seated occupant. In the "TTOL" position, seat back 120 is positioned upright to support a vertical posture in an occupant. When crew seat 100 is configured in a different position, seat bottom 110 may recline via a mechanical linkage included in frame 200.

Leg rest 130 comprises a pad suitable for supporting the calves of an occupant in certain configurations of crew seat 100. As demonstrated in FIG. 1C, a cushion 131 of leg rest 130 is configured on top of leg rest 130 to increase occupant comfort, while a leg rest base 132 comprises a rigid underside of leg rest 130 configured to maintain the shape of leg rest 130 when crew seat 100 is occupied. As with cushion 111, cushion 131 may comprise memory foam to more comfortably accommodate an occupant and preserve the aesthetic of crew seat 100 when no occupant is seated in crew seat 100. In the "TTOL" position, leg rest 130 is positioned vertically (possibly tucked underneath seat bottom 110) and may or may not contact an occupant's calves. When crew seat 100 is configured in a different position, leg rest 130 may be raised via a mechanical linkage 230 included in frame 200, and leg rest 130 may support an occupant's calves in positions where leg rest 130 is raised.

Armrests 140 comprise contoured pads 141 disposed on rigid supports 144, which together make armrests 140 suitable for comfortably supporting an occupant's wrists and forearms. Contoured pads 141 may be cushioned or upholstered, or they may comprise memory foam. Contoured pads 141 are contoured to provide a pleasing aesthetic and to conform to the shape of an occupant's forearms and wrists in a sitting and neutral body posture. Armrests 140 may also comprise an overhang 143 suitable for providing a place for an occupant to rest the sides of their legs. Armrests 140 may be shaped to provide a pleasing aesthetic with no gaps in crew seat 100, such as with a groove 142 in each armrest 140 that aligns neatly with a groove 124 in seat back 120 when crew seat 100 is in the "TTOL" position. In embodiments, armrests 140 (specifically rigid supports 144) are secured via mounting means to arms 212 of brackets 211, wherein arms 212 are extending portions of brackets 211 configured to hold armrests 140 in place relative to seat bottom 110. Each armrest 140 may comprise mirror symmetry relative to the opposite armrest 140 to further enhance the aesthetic of crew seat 100 and to reduce the design complexity of crew seat 100.

Frame 200 is a plastic, metal, or otherwise rigid frame of crew seat 100 configured to house or support seating components and mechanical linkages of crew seat 100. Frame 200 comprises a pair of trusses 201. Trusses 201 are two rigid frames disposed parallel to one another in a vertical upright position. For supporting crew seat 100 in a plurality of positions, each truss 201 comprises mounting points for seat back 120, brackets 211, mechanical linkage 230 and other mechanical linkages, and other components of crew seat 100 discussed in the following figures. The two trusses 201 may be identical or mirror-symmetrical such that the pair of trusses 201 may be used as foundational elements to support components of crew seat 100 and attach crew seat 100 to an aircraft. To achieve a lightweight rigid construction, trusses 201 may comprise composite materials such as carbon fiber or lightweight metals such as aluminum or titanium. Other components discussed in the present disclosure which are described as "rigid" or "lightweight" may comprise the same or similar materials to reduce the total number of materials required in crew seat 100 while maintaining a sufficiently rigid construction, With high rigidity and strength, trusses 201 may bear the entire weight of crew seat 100 apart from any attachment means which mount crew seat 100 to an aircraft floor. The use of only two trusses 201 provides a compact design and simplifies construction with fewer unique parts required to construct crew seat 100.

Figure 1B:
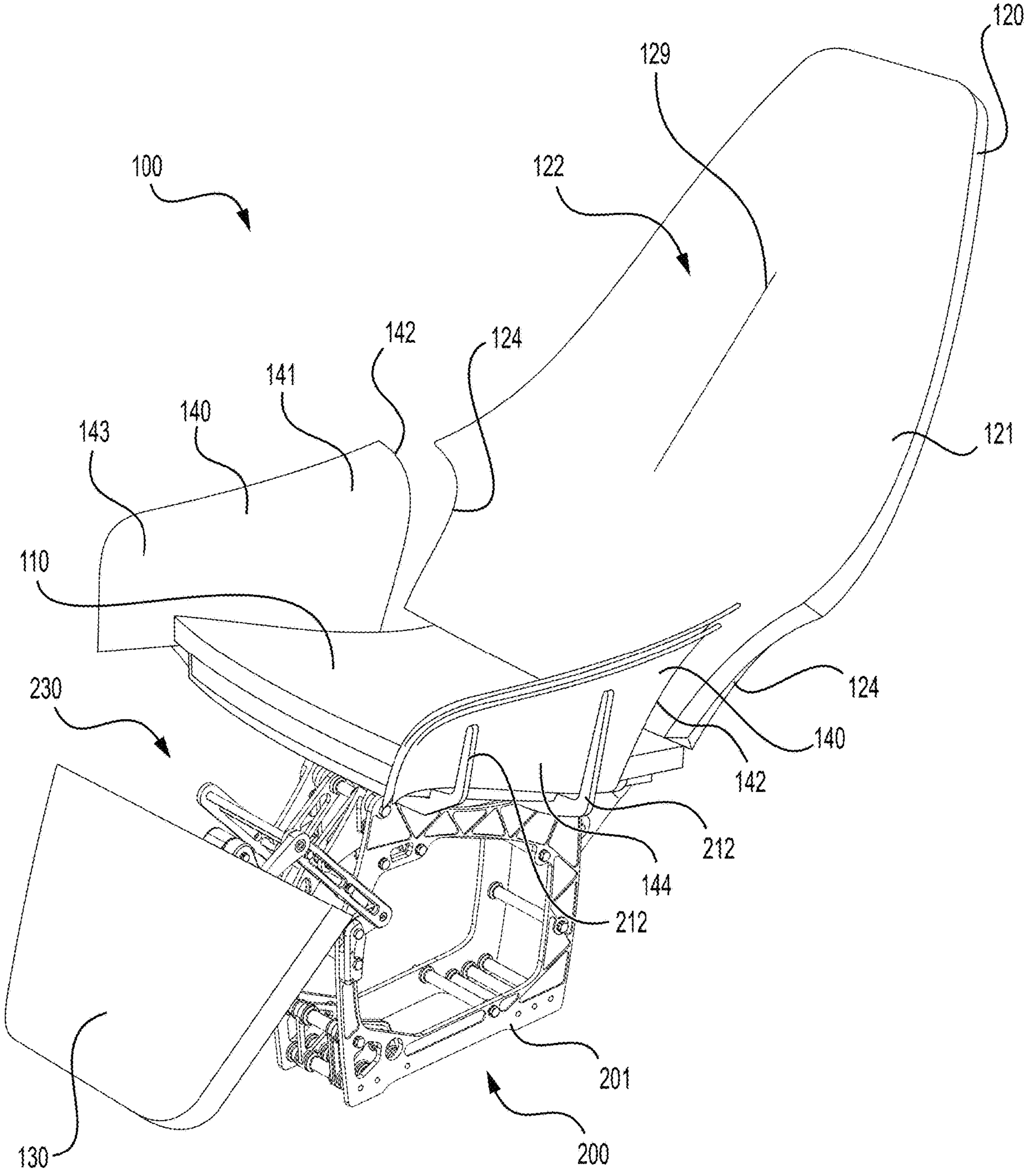
FIG. 1B gives a view of the crew seat in FIG. 1A configured in an "enhanced" position.

FIG. 1B demonstrates the crew seat 100 of FIG. 1A semi-reclined into an "enhanced" position, wherein the shape of crew seat 100 is reconfigured to allow an occupant to recline. Compared to the "TTOL" position, seat bottom 110 is pitched upwards slightly and seat back 120 is reclined accordingly. Armrests 140 are pitched in accordance with seat bottom 110, and a gap is now present between armrests 140 and seat back 120 such that grooves 124 and 142 no longer meet. Leg rest 130 is rotated upward and outward at an acute angle relative to vertical (approximately 30 degrees), such that an occupant's feet are now raised from the floor of an aircraft and the occupant's calves rest against a top upholstered portion of leg rest 130. Frame 200, specifically trusses 201, remain positionally static and are secured to the floor of the aircraft.

Figure 1C:
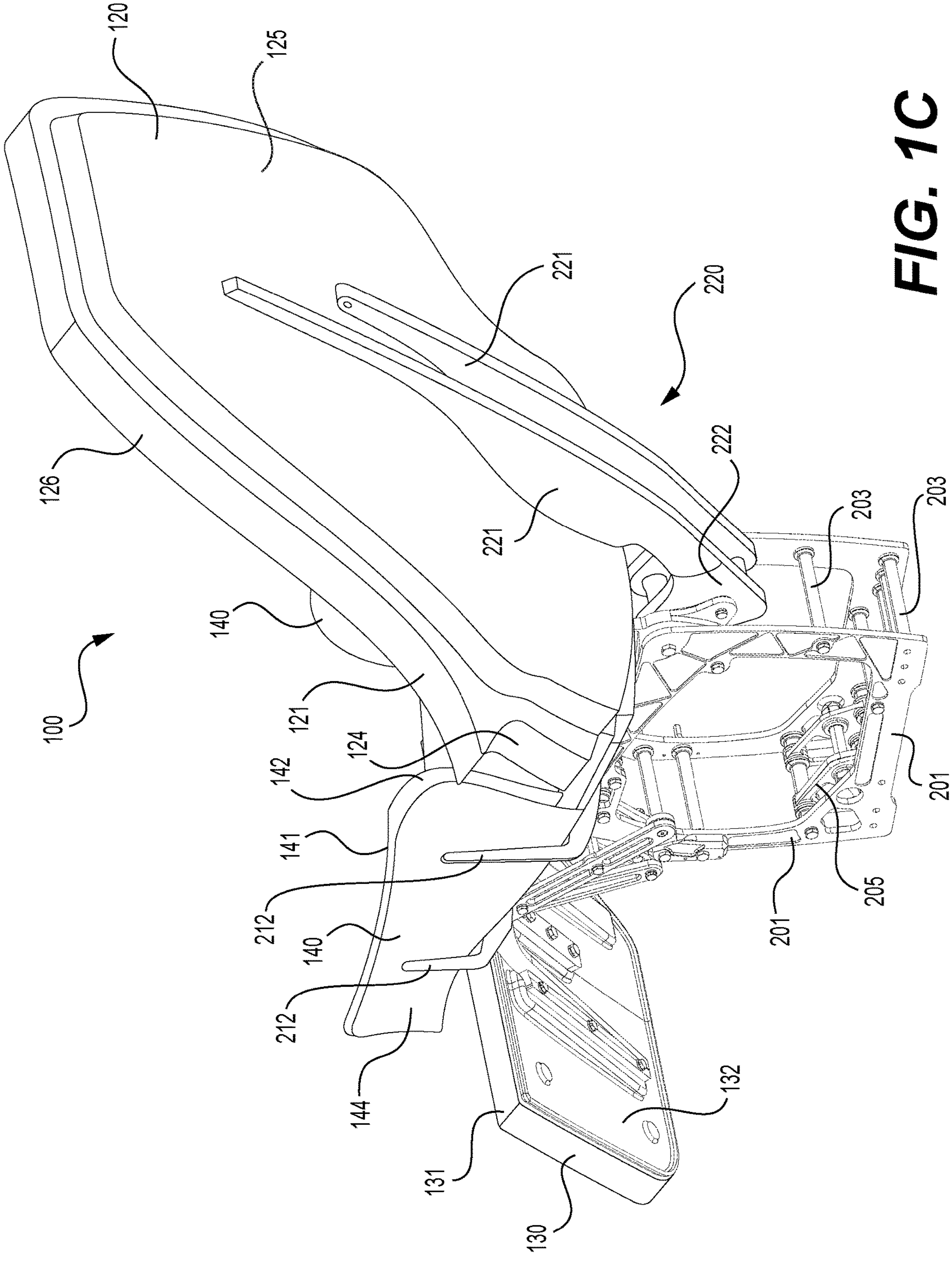
FIG. 1C gives an alternate view of the crew seat configured in an "enhanced" position.

FIG. 1C provides a back perspective view of the crew seat of FIG. 1B. FIG. 1C provides a view of backbone 220, to which seat back 120 is mounted. Backbone 220 extends from the rear of seat bottom 110 to the top of seat back 120 (or nearly the top of seat back 120), and backbone 220 provides a rigid structure configured to secure seat back 120 to frame 200. Spine 221 is the portion of backbone 220 to which seat back 120 is mounted, and base 222 is the portion of backbone 220 which is secured to frame 200. Furthermore, in embodiments, seat back 120 comprises a rigid portion 125 suitable for mounting seat back 120 to rigid components and a cushioned portion 126 suitable for comfortably receiving an occupant. Cushioned portion 126 comprises memory foam in embodiments and may include a relief 129 adapted for the spine of an occupant, wherein relief 129 is a depression, cutout, or other feature in the memory foam. Relief 129 may also comprise a groove or cutout (not shown) molded in rigid portion 125 configured to house an occupant's spine.

In FIG. 1C, attachment member 205 is visible as a component of frame 200 disposed between trusses 201. Attachment member 205 comprises a series of mounting rods, mounting loops, hooks, or other mechanisms configured to attach crew seat 100 to the floor of an aircraft. For instance, a hook or a band in the floor may be drawn around a mounting rod of attachment member 205 such that frame 200 is secured to the aircraft floor, and crew seat 100 may be moved between a plurality of positions without instability. Such a means of mounting may also be secured to a linking member 203. Frame 200 comprises a plurality of linking members 203, wherein each linking member 203 is a rod with each end screwed or bolted into a truss 201 to rigidly secure each truss 201 to one another. Trusses 201 are disposed at a uniform width apart by a plurality of linking members 203 and comprise left-right mirror symmetry and/or may be identical components to reduce the complexity of construction. Some linking members 203 may comprise bushings disposed on their ends to assist in the functions of mechanical linkages 210 and 230. Otherwise, any two linking members 203 may be identical components to reduce the amount of different parts used in the construction of crew seat 100.

Figure 1D:
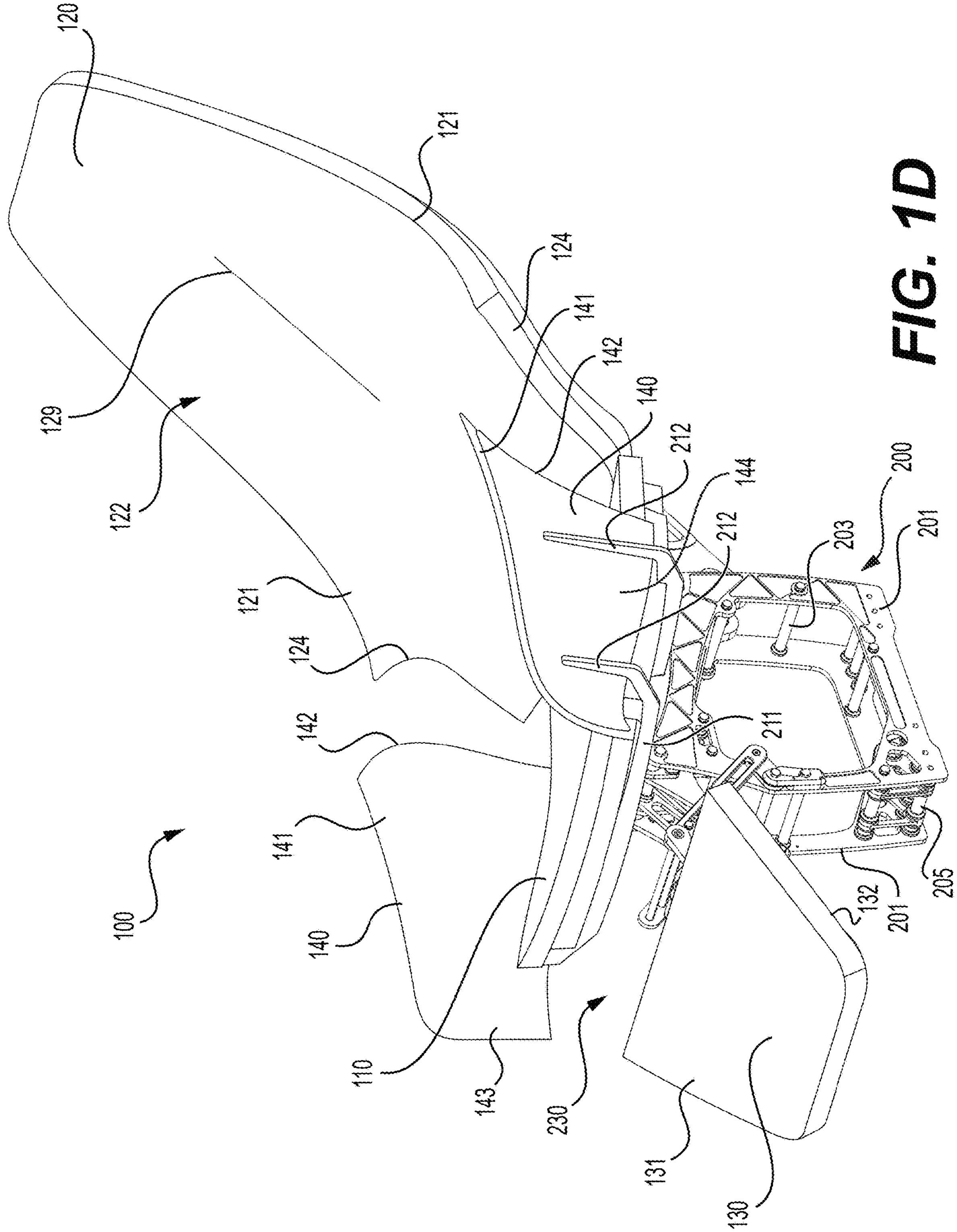
FIG. 1D gives a view of the crew seat in FIG. 1A configured in a zero-gravity ("zero-G") position.

In FIG. 1D, crew seat 100 is fully reclined into a "zero-G" position, wherein an occupant assumes a neutral body posture. Compared to the "TTOL" and "enhanced" positions, seat bottom 110 is pitched upwards to a maximum angle and seat back 120 is fully reclined. Armrests 140 are pitched in accordance with seat bottom 110. Leg rest 130 rotates upward and moves outward and is disposed outward at an angle from the vertical (approximately 60 degrees), such that an occupant's legs and/or feet resting on leg rest 130 are raised more so from the "enhanced" position. In this position or the slumber position, wherein an occupant may have their feet raised off the ground and the entire weight of the occupant is supported by crew seat 100, an occupant may be enveloped by the contours and cushioning of crew seat 100 to evenly distribute pressure across the occupant's body.

Figure 2A:
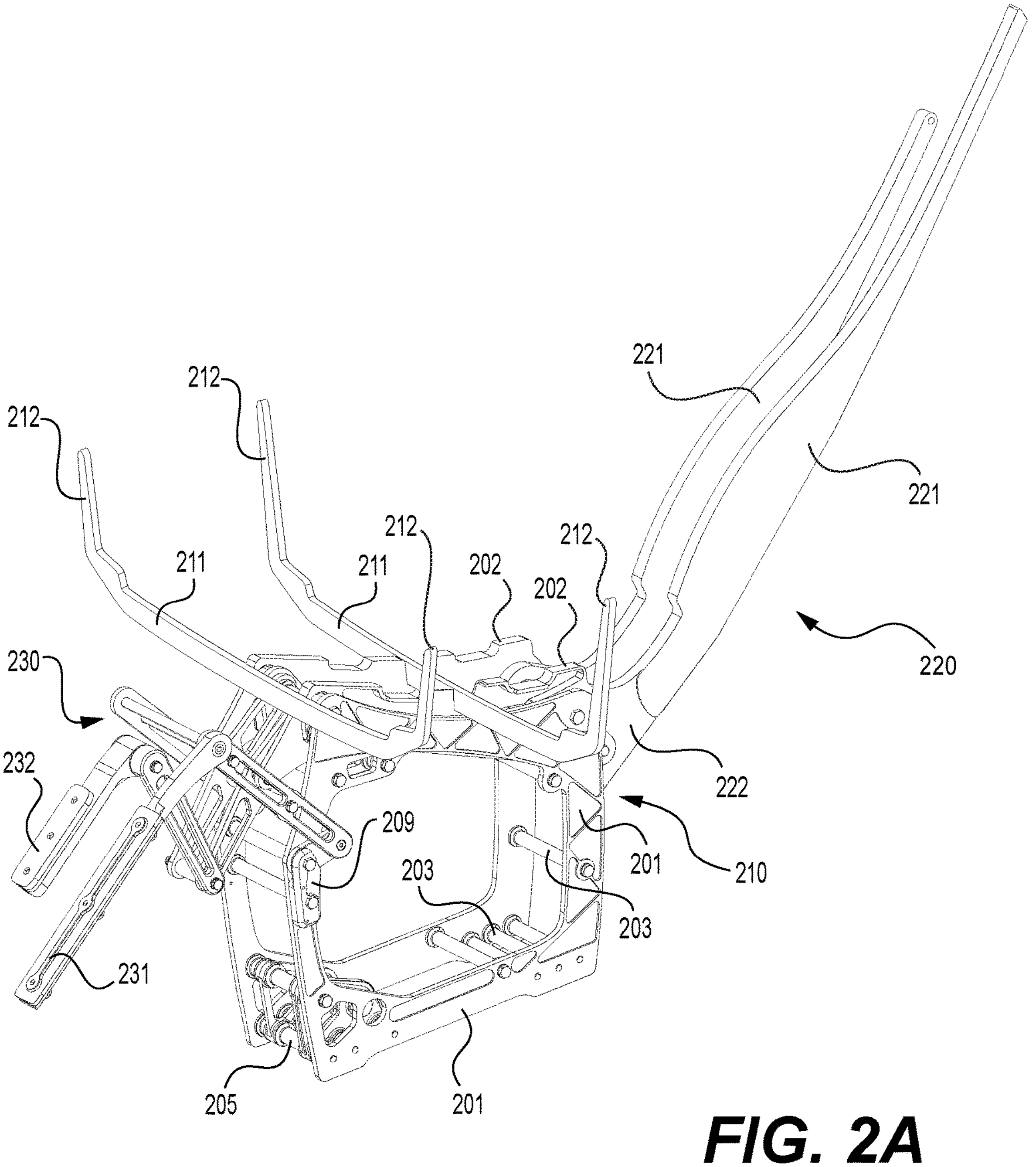
FIG. 2A is a view of the support assembly underlying the seat with the seat configured in an "enhanced position"

FIG. 2A depicts an embodiment frame 200 of crew seat 100, with seat bottom 110, seat back 120, leg rest 130, and armrests 140 omitted from view for clarity of illustration. Frame 200 comprises trusses 201, platform 202, attachment member 205, backbone 220, mechanical linkage 210, and mechanical linkage 230. Frame 200 is configured to allow for adjustable seating between a plurality of seating positions. In the embodiment shown in FIG. 2A, mechanical linkages 210, 230 move simultaneously when the seat is adjusted, and the repositioning of elements of frame 200 by movement of mechanical linkages 210, 230 results in crew seat 100 assuming a given seating position. Mechanical linkages 210, 230 may be configured to move independently in certain embodiments, and other embodiments may contain additional mechanical linkages configured to reposition components of crew seat 100 without departing from the scope hereof.

Platform 202 is a rigid seat rocker configured to mount seat bottom 110 to frame 200. If not configured on seat bottom 110, brackets 211 are mounted on platform 202. While one end of platform 202 is connected at a pivot to mechanical linkage 230 via an arm 235, the other end of platform 202 is connected at a pivot to base 222 of backbone 220 as part of mechanical linkage 230. The movement of platform 202 unites the movements of mechanical linkages 210, 230. Mechanical linkage 230 is discussed further in FIGS. 2B, 3A, and 3B, while mechanical linkage 210 is discussed further in FIGS. 3A and 3B. In an embodiment, a plurality of platforms 202 are used wherein each platform 202 is identical and/or possesses left-right mirror symmetry and behaves identically to its counterpart platform 202 in each mechanical linkage. The embodiment platform 202 discussed in FIGS. 2A, 2B, 2C, 3A, and 3B comprises two rocker components with mirror symmetry.

Platform 202 and attachment member 205 are sandwiched between trusses 201; when crew seat 100 is adjusted to assume a new seating position, platform 202 moves relative to trusses 201. A plurality of linking members 203 are disposed between trusses 201, wherein each linking member 203 is a rigid rod of uniform length. In an embodiment, each linking member 205 is of the same length such that trusses 201 remain evenly spaced between one another. Each linking member 205 may be secured to each truss 201 via a screw or bolt at the end of each linking member. Any linking member 205 may be used to provide a mounting surface for a hook or band, as with attachment member 205, and a portion of platform 202 may rest on a particular linking member 205 or a bushing configured on a linking member 205 when crew seat 100 is adjusted to a particular position.

Figure 2B:
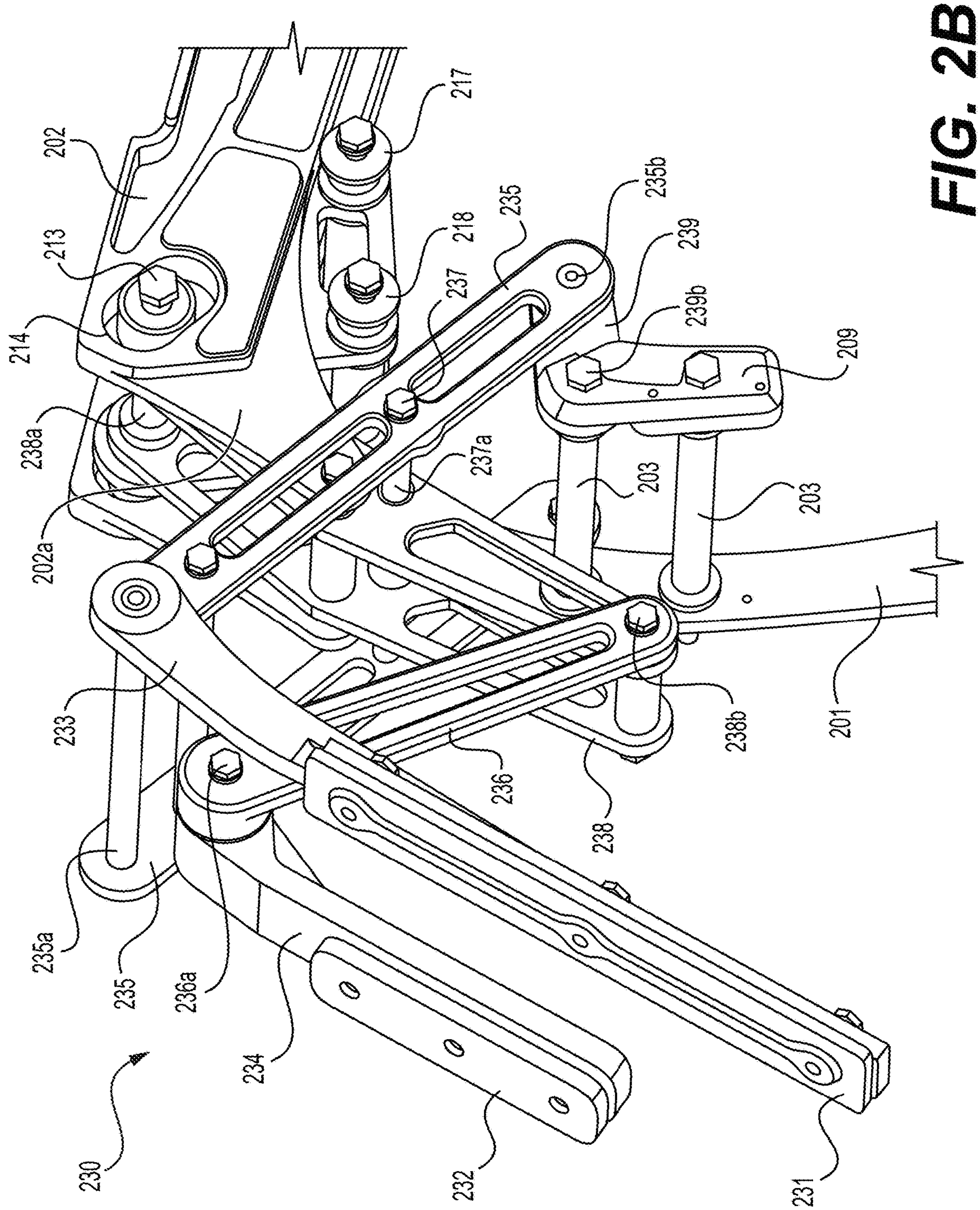
FIG. 2B is a focused view of a mechanical linkage comprising the crew seat with the seat configured in an "enhanced" position.

Now referring to FIG. 2B, mechanical linkage 230 comprises: feet 231; arms 233, 234, 235, 236, and 238; central joint 237; base arm 239; and mount 209. Feet 231 are rigid platforms configured to mount leg rest 130 to mechanical linkage 230. Arms 233, 234, 235, 236, and 238 are configured as a scissor-and-diamond linkage that raises leg rest 130 along an arc 300 when mechanical linkage 230 extends and lowers leg rest 130 when mechanical linkage 230 retracts. In FIGS. 2B, 2C, 3A, 3B, and 3C, crew seat 100 is shown with one of trusses 201 removed to more clearly demonstrate the motion of platform 202 and other features of mechanical linkages 210, 230.

Feet 231 and 232 are rigid mounting boards each configured to mount leg rest 130, such as via screws, bolts, glue, or other means of attachment. Foot 231 is rigidly fixed to arm 233 and foot 232 is rigidly fixed to arm 234. As leg rest 130 is rigid, feet 231 and 232 may rotate on their respective arms 233 and 234 but always remain in the same plane regardless of the position mechanical linkage 230, thereby retaining mirror symmetry of leg rest 130 at all times while an occupant is seated.

Each arm 233, 234, 235, 236, and 238 comprises a joint at both ends to allow pivoting of any two joined arms. Arms 235 and 238 share a central joint 237 via an extending member **237*a*, wherein central joint 237 serves as the middle joint of a scissor linkage between arms 235 and 238. Arms 235 and 233 share a pivot 235*a* and comprise a two-arm branch. Arms 238, 236, and 234 comprise a three-arm branch. Arms 238 and 236 share a joint 238*b*, and arms 236 and 234 share a joint 236*a*. Arm 236 is shorter than arm 235, which biases arms 233 and 234 to rotate upward in unison when mechanical linkage 230 is extended, thereby moving leg rest 130** along an arc.

Arm 234 pivots on a joint 236*a* of arm 236. Arm 236 pivots on a joint 238*b* of arm 238. Arm 238 pivots on a rigid mount of trusses 201 at a joint 238*a*; as the linkage extends, joint 238*a* remains positionally static with respect to trusses 201 while joints 236*a*, 238*b* travel as the linkage extends. Thus, arm 238 rotates on joint 238*a* about an arc, and the bottom of this arc is defined by the position of crew seat 100 in the rest position. When arm 238 is at the top of the arc, such as in the "zero-G" position, leg rest 130 is fully raised and mechanical linkage 230 is fully extended.

Arm 235 is linked to arm 238 via an extending member 237*a* that comprises a central joint 237. Arm 235 may rotate about central joint 237 but is constrained by extending member 237*a* to also translate alongside arm 238 as arm 238 travels along its arc. As arm 238 rotates about joint 238*a*, arm 235 simultaneously follows the path of arm 238 and rotates about central joint 237. Arm 238 is also linked to platform 202 at a joint 238*c* such that when arm 238 rotates relative to trusses 201, platform 202 rises.

In embodiments, the translation of arm 235 relative to arm 238 is permitted by a base arm 239. A mount 209 is configured on each truss 201 to hold a base arm 239. Base arm 239 rotates in a defined arc about a joint 239*b*, with the position of joint 239*b* fixed by base arm 239 being fixed to mount 209, and the range of this arc constrains the range of motion of mechanical linkage 230 as base arm 239 is restricted in its range of motion by mount 209. Arm 235 pivots on base arm 239 at a joint 235*b*. As base arm 239 pivots on joint 239*b*, and as arm 235 pivots on joint 235*b*, arm 235 translates along the path of arm 238 as arm 238 rotates.

As platform 202 rises, a bushing 213 remains static while a slide 214 moves relative to bushing 213 such that bushing 213 moves along a path within slide 214. Slide 214 is a linear hollow cutout of platform 202 configured as the same width of bushing 213 in a direction lateral to the movement of platform 202. Bushing 213 is disposed on joint 238*a*, and accordingly remains positionally static to trusses 201 as mechanical linkage 230 extends or retracts. The length of slide 214 defines the range of motion of platform 202: when mechanical linkage 230 is fully extended, bushing 213 contacts one end of slide 214, and when mechanical linkage 230 is fully retracted, bushing 213 contacts the other end of slide 214. When crew seat 100 is configured in certain positions, platform 202 may also rest on a bushing 218 or 217, as discussed further in FIGS. 3A and 3B.

Figure 2C:
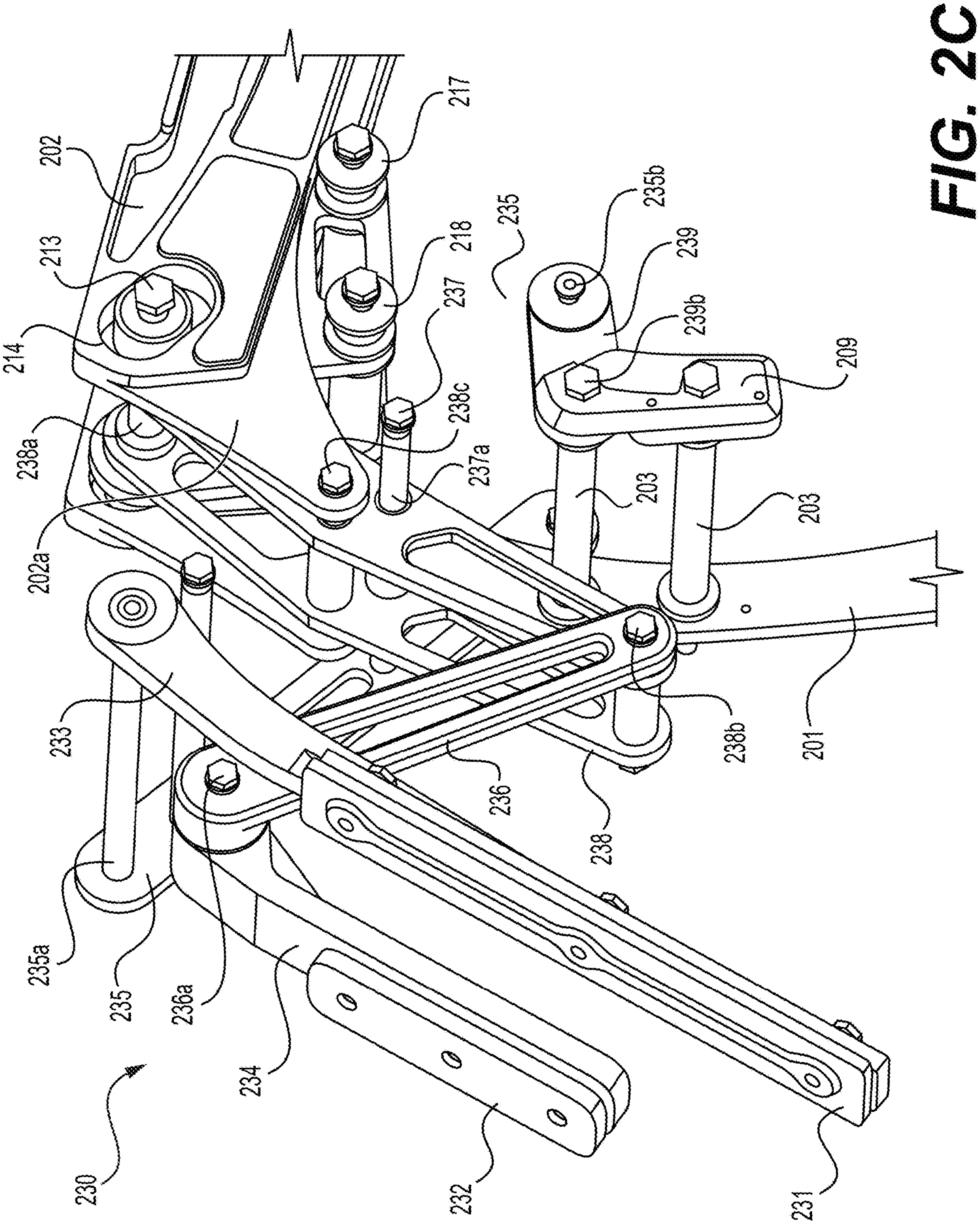
FIG. 2C is an identical view to that of FIG. 2B with a portion of a component of the mechanical linkage removed.

FIG. 2C demonstrates the same view as FIG. 2B with a portion of arm 235 removed to more clearly show extending member 237*a* and a platform extension 202*a*. Platform extension 202*a* of platform 202 is mechanically coupled to arm 238 at a joint 238*c*. Like arm 235, platform 202 travels along the path of arm 238 but may also pivot with respect to arm 238. Joint 238*c* is a part of a mechanical linkage 210, which links the movement of arm 238 to the reclining of seat back 120.

Figure 3A:
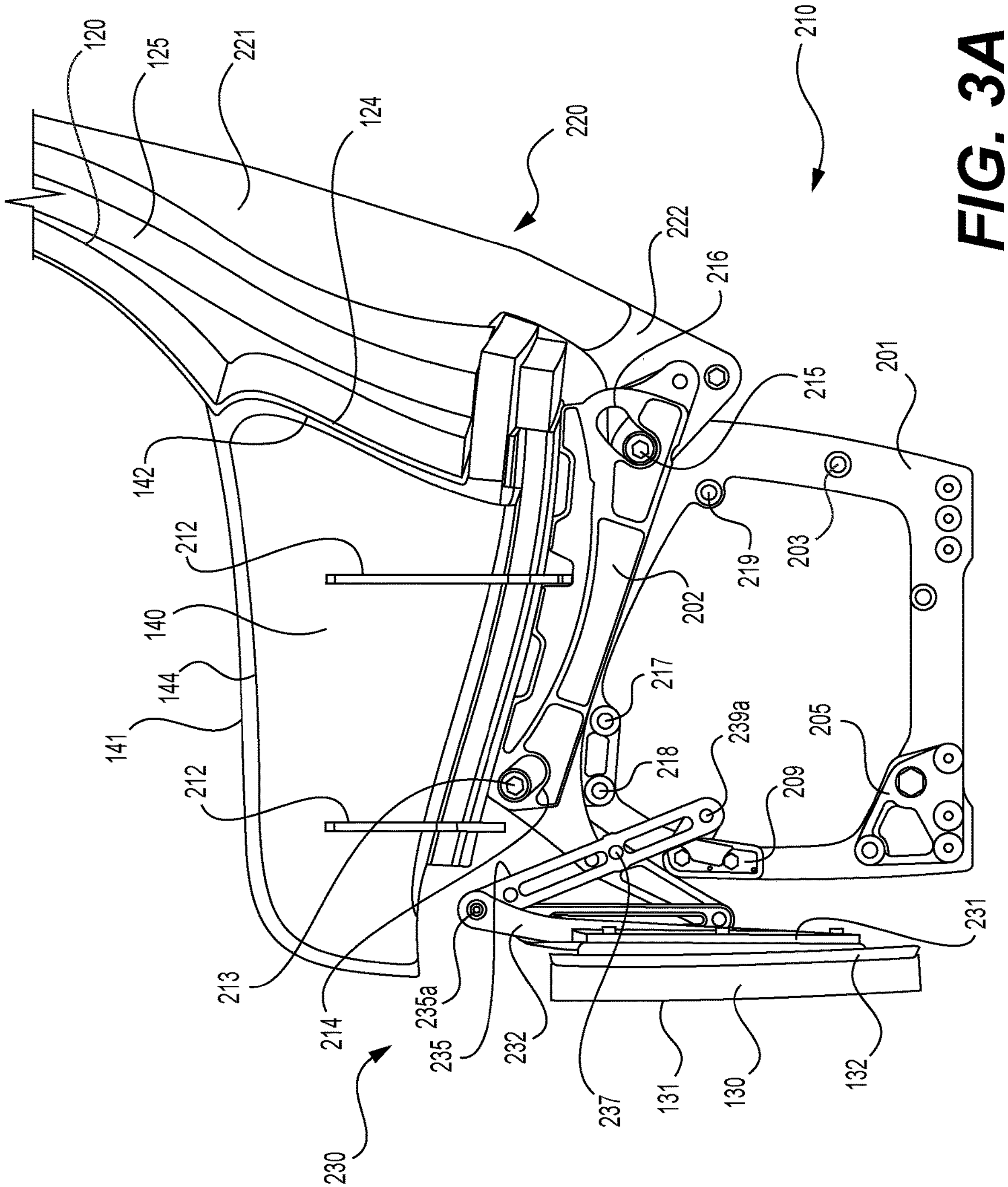
FIG. 3A is a side orthographic view demonstrating another mechanical linkage of the support assembly in the "TTOL" position.
Figure 3B:
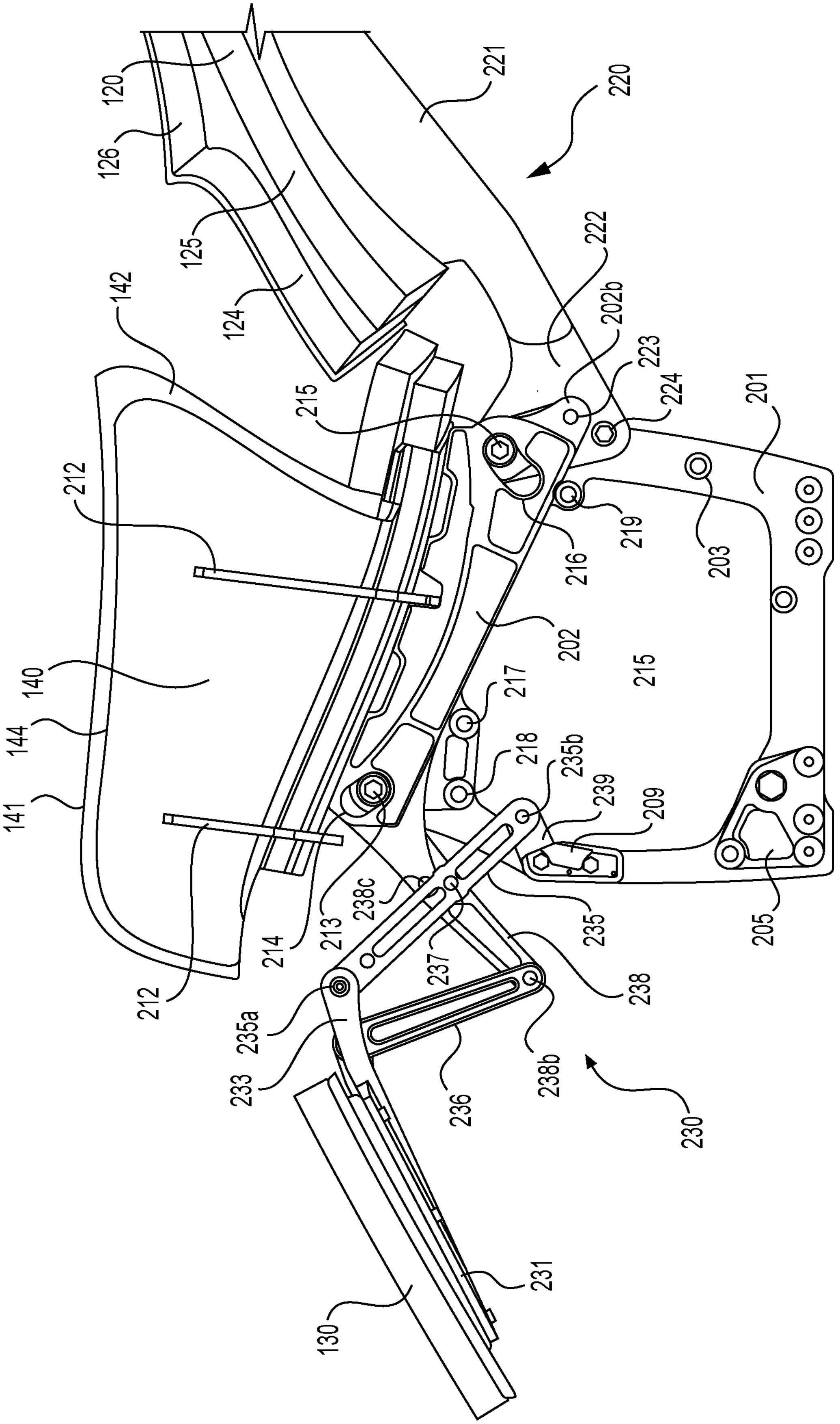
FIG. 3B is a side orthographic view demonstrating both mechanical linkages of the support assembly in the "zero-G" position.

Referring now to FIGS. 3A and 3B, mechanical linkage 210 links the pitching motion of platform 202 and seat bottom 110 to the reclining motion of backbone 220 and seat back 120 via a series of bushings that remain static as platform 202 slides relative to the bushings. As seen in FIG. 3A, platform 202 rests on bushing 218 in the "TTOL" position, wherein mechanical linkages 230 and 210 are fully retracted. As seen in FIG. 3B, platform 202 rests on bushing 219 in the "zero-G" position, where mechanical linkages 230 and 210 are fully extended. Mechanical linkage 210 comprises platform 202, arm 238, backbone 220, slides 214, 216, bushings 213, 215, and a joint 223. While comprising platform extension 202*a* linked to arm 238 via joint 238*a*, platform 202 also comprises a platform extension 202*b* configured with joint 223. Backbone 220 is linked to joint 223 at base 222 such that backbone 220 may pivot relative to platform 202. As platform 202 pitches up when mechanical linkage 230 extends (as discussed alongside FIGS. 2A, 2B, and 2C), a bushing 215 remains static within a slide 216 while slide 216 moves relative to bushing 215 such that bushing 215 moves along a path within slide 216. Slide 216 is a linear hollow cutout of platform 202 configured as the same width of bushing 215 in a direction lateral to the movement of platform 202. When bushing 215 slides up slide 216, backbone 220 and consequently seat back 120 recline. In the "zero-G" position, when seat back 120 is fully reclined as seen in FIG. 3B, platform 202 rests on bushing 219 and bushing 215 rests against one end of slide 216. In the "TTOL" position, when seat back 120 is fully upright as seen in FIG. 3A, platform 202 rests on bushing 218 and bushing 215 rests against the other end of slide 216.

Figure 3C:
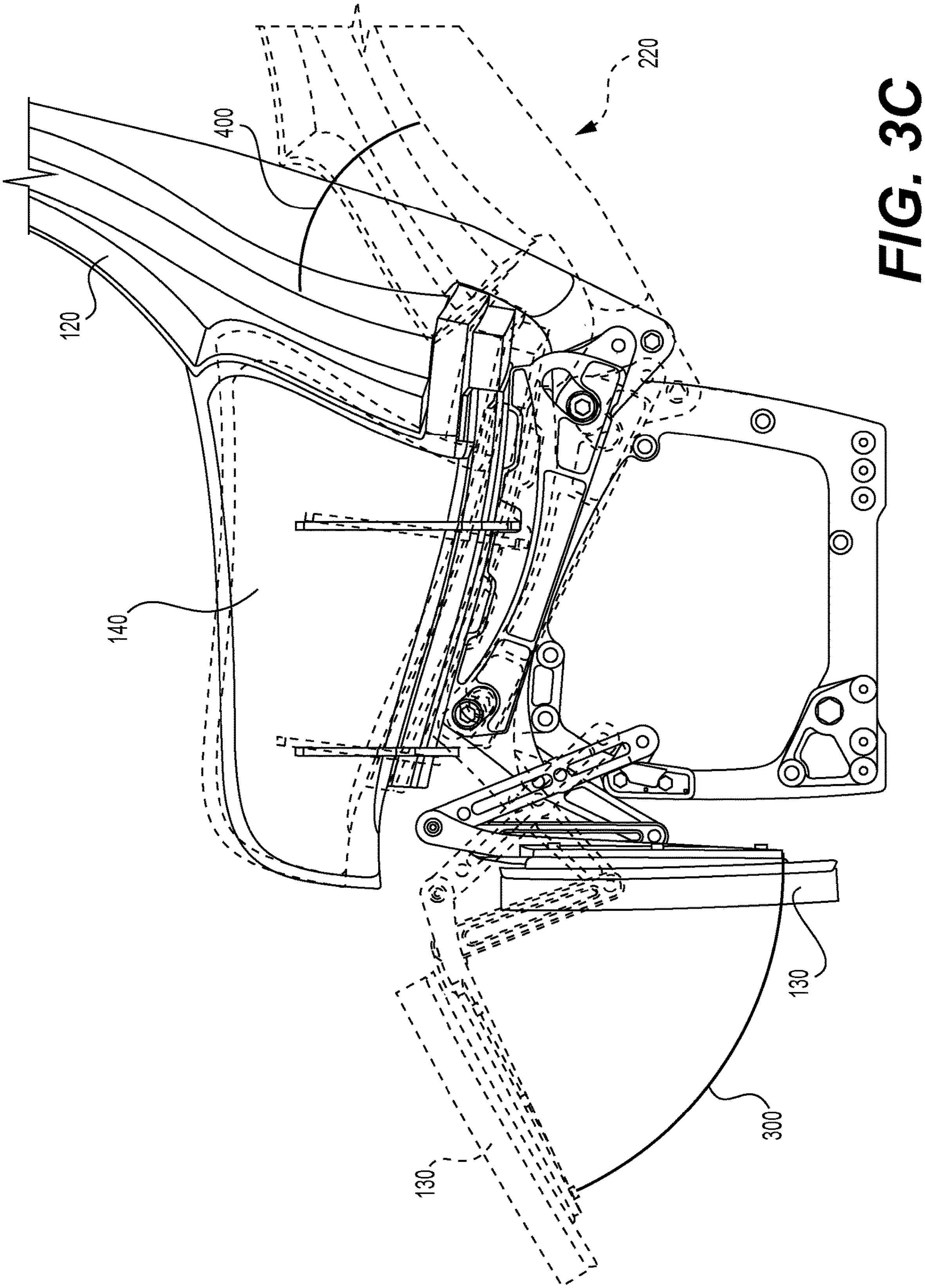
FIG. 3C depicts arcs of motion along which a seat back and leg rest of the crew seat may travel when the mechanical linkages are extended.

FIG. 3C depicts arcs 300 and 400, along which leg rest 130 and seat back 120 travel respectively. When mechanical linkages 230 and 210 actuate, leg rest 130 and seat back 120 travel along arcs 300 and 400. The motion of crew seat 100 between a task position and a zero-G position is demonstrated to highlight the trajectories of components as crew seat 100 is adjusted. Leg rest 130 travels along arc 300 when mechanical linkage 230 is extended. Arc 300 is a visualization of the upward rising and outward extending motion of leg rest 130 as previously described. Similarly, seat back 120 travels along arc 400 when mechanical linkage 210 is raised. Arc 400 demonstrates the reclining path of seat back 120 as previously described. Seat bottom 110 is also pitched up as previously described. In embodiments, any component of crew seat 100 coupled to a mechanical linkage may follow an alternate arc, and more or fewer components may follow any given arc.

To summarize, the embodiment of crew seat 100 depicted in FIGS. 3A, 3B and 3C comprises mechanical linkages 230 and 210 which engage simultaneously to raise leg rest 130, recline seat back 120, and pitch seat bottom 110 via the motion of arm 238. While a plurality of bushings 217, 218, and 219 may confine the maximum range of extension or retraction of mechanical linkages 210, 230, a locking mechanism (not shown) may be present on crew seat 100 to secure crew seat 100 into a given position. In an embodiment, a motor 310 is configured to secure crew seat 100 into a given position. For example, motor 310 is disposed on base arm 239, a portion of seat back 120, or another component of frame 200 to automatically adjust the position of crew seat 100 and to maintain crew seat 100 in that position. Motor 310 may comprise a motor that is not back-drivable when unpowered (for example, a stepper motor), such that the current seating configuration is held in the event that power to motor 310 is lost. Alternatively, a biasing mechanism may be employed to secure crew seat 100 into a pre-defined position, such as with a groove in slide 216 configured to hold bushing 215 in place when the motor is inactive. Actuation of motor 310 may also be prohibited when the motor is unpowered, such that a separate locking mechanism is not required and motor 310 need only be unpowered to secure crew seat 100 into a particular position. This is an important consideration for use onboard aircraft since the seat must be locked in a fixed position for safety of the passenger in the event of an electrical outage. The seat may be configured to position itself into one of several pre-defined seating positions, including a "TTOL," "enhanced," "task," and "zero-G" position.

Figure 4:
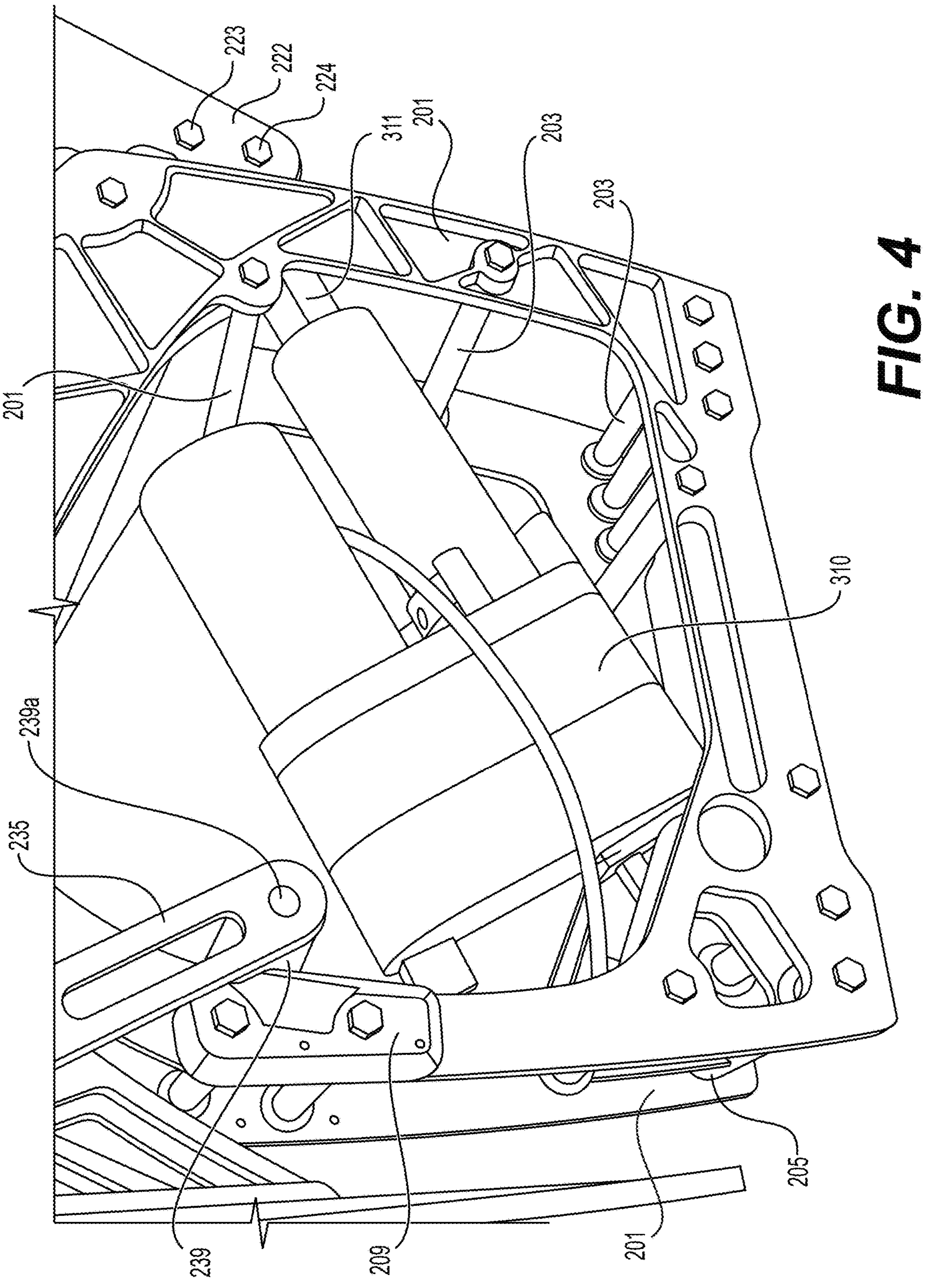
FIG. 4 depicts an embodiment motor configured within the crew seat.

FIG. 4 depicts an embodiment motor 310 configured to move crew seat 100 between a plurality of positions and to secure crew seat 100 in each of these positions. Motor 310 comprises an electric actuator, a pushrod, a mechanical actuator, or another means of providing a force via translational or rotational means. In embodiments, motor 310 may be configured to apply a force or torque to any component of one of mechanical linkages 210 or 230 such that activation of the motor engages either linkage. In an embodiment providing a compact design, motor 310 is configured on attachment member 205 between trusses 201 such that motor 310 is secured relative to frame 200 and does not increase the footprint of crew seat 100. An extending member 311 operatively couped to motor 310 may be extended or retracted to reposition crew seat 100, and in an embodiment, extending member 311 is mounted on joint 224 of base 222 via a linking member (not shown) such that a linear force applied to joint 224 causes a rotation of base 222 relative to joint 224, thereby reclining seat back 120 and repositioning any other components linked to seat back 120 via mechanical linkages. When crew seat 100 is in the task position, or its most upright orientation, extending member 311 may be retracted by motor 310 to engage mechanical linkages 210, 230 and thereby recline seat back 120, pitch up platform 202, and extend leg rest 130. Similarly, to return to a more upright position, motor 310 may extend extending member 311. Once configured into a desired position, motor 310 may stop with the position of extending member 311 locked in place by a locking mechanism.

In alternate embodiments, motor 310 may act on a different portion of crew seat 100 to reposition the seat, such as by acting on a component of mechanical linkage 230 by imparting a rotational force or by pitching up platform 202 directly via a linear motion of extending member 311. Additional arrangements of motor 310 may be employed without departing from the scope hereof.

In further embodiments, a user may be able to manually adjust the angle of seat bottom 110. For instance, the "Task" position may be adjusted along multiple non-discrete locations along 10 degrees of actuation. Crew seat 100 may be adjusted to the "Zero-G" position, then up to 10 degrees of forward angle may be applied. Motor 310 may receive control signals to adjust the position of crew seat 100 via a control panel 280 disposed on crew seat 100, or via a mobile device in communication with motor 310 or control panel 280. Control panel 280 is a controller that may comprise a computer comprising software installed in non-volatile memory, wherein the software may execute instructions or issue commands to motor 310 to adjust crew seat 100 into a selected position. A touchscreen display or labeled buttons on control panel 280 may display possible positions which crew seat 100 may be configured into. For instance, a user may select a particular seating arrangement displayed on control panel 280, and control panel 280 may then send a command to motor 310 to adjust the seat into that position. Control panel 280 may also permit non-discrete adjustment of crew seat 100 along a defined range of motion. For instance, when crew seat 100 is in the Task position, platform 202 may be permitted 10 degrees of motion, and a user may adjust platform 202 and seating components attached to it (such as seat bottom 110 and seat back 120) to any partial angle within the provided range as preferred by the user for comfort or task positioning.

A mobile device may also be used to select a seating position or perform non-discrete adjustment of crew seat 100. In embodiments, a mobile device may connect via Internet, Bluetooth, or other wireless means to a computer configured to engage motor 310. The display on the mobile device may indicate the seating positions available on crew seat 100, and one of these options may be selected on the mobile device. When an option is selected, the mobile device may send a signal to the computer, and the computer may then execute instructions to drive motor 310 until crew seat 100 is in the user-selected position.

Figure 5:
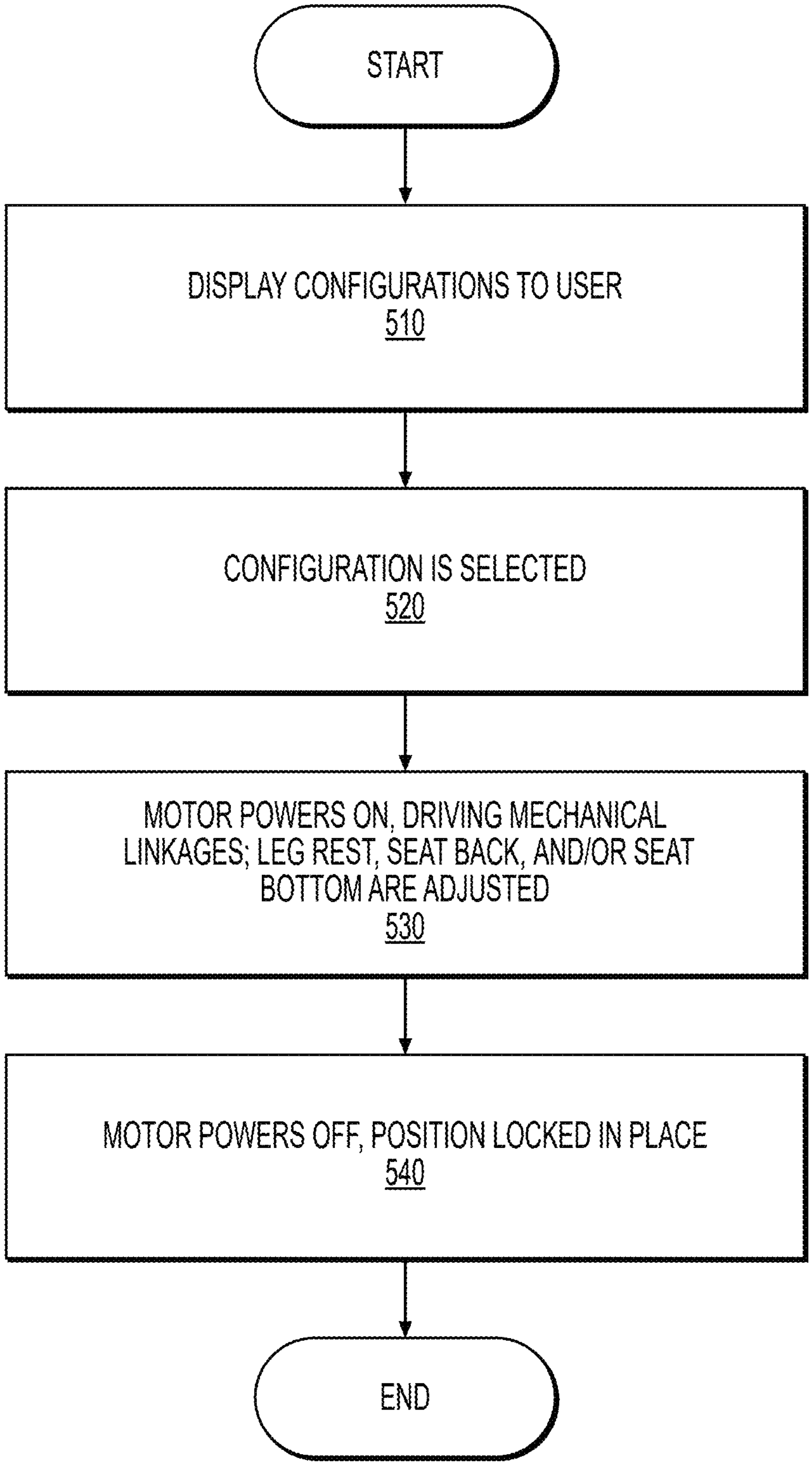
FIG. 5 depicts an embodiment method for enabling a user or occupant of the crew seat to adjust the seating position of the seat.

FIG. 5 demonstrates an embodiment process 500 for adjusting crew seat 100 into a particular position, such as the Task, TTOL, Enhanced, Zero-G or Slumber positions. Process 500 comprises a method for accepting user input to adjust a crew seat.

In step 510, possible configurations of crew seat 100 are displayed or suggested to a user. In embodiments, images or descriptions of the configurations may appear on a control panel 280 for a user to select by pressing a button or a touchscreen icon associated with a particular configuration. On a mobile device with a touchscreen, a list of titles or icons of possible configurations may be displayed, and a user may press on the title or icon to select the corresponding configuration.

In step 520, a configuration is selected and registered by control panel 280. Control panel 280 may comprise a set of instructions for orienting the chair into a selected configuration, for instance, by powering motor 310 for a certain period of time, applying a certain force to motor 310, or adjusting extending member 311 to a particular length.

In step 530, control panel 280 executes the instructions. Motor 310 is powered on and drives any mechanical linkages (such as mechanical linkages 210, 230) comprising crew seat 100 to adjust the chair into the desired position. For instance, motor 310 may extend mechanical linkage 230 to configure crew seat 100 out of the TTOL position into the slumber position, or motor 310 may retract mechanical linkage 230 to configure crew seat 100 out of the zero-G configuration into the Task configuration. A reconfiguration between any two positions may be possible. In embodiments, motor 310 may engage only a single mechanical linkage to adjust only specific components of crew seat 100, such as raising mechanical linkage 210 without extending mechanical linkage 230. In these embodiments, control panel 280 may provide selectable options for users to modify the positioning of certain elements of crew seat 100, such as to only recline seat back 120 or to only raise leg rest 130.

In step 540, crew seat 100 has been configured into the selected position and motor 310 stops. The motor 310 may hold crew seat 100 in the selected position as described above, Alternatively, a locking mechanism such as a pin or a brake (not shown) may be employed to hold crew seat 100 in the selected position. In embodiments, such as embodiments where the Task position allows for crew seat 100 to be adjusted along a range of motion, step 530 may comprise a continuous input from the user wherein the user presses a control on the control panel until a desired angle of reclining is reached.

Process 500 may be repeated as long as control panel 280 and crew seat 100 are operable, with an occupant of crew seat 100 able to select a new position to reconfigure crew seat 100 at any time.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

What is claimed is:

1. An adjustable aircraft seat comprising:

a plurality of contoured seat components including a seat bottom, a seat back, a leg rest, and armrests, wherein each component of the plurality comprises a cushioned portion mounted on a base portion;

a frame configured to support the seat bottom, seat back, leg rest, and armrests via each respective base portion;

a motor mounted on the frame;

a mechanical linkage operatively coupling the motor with components of the frame such that operation of the motor moves the seat bottom, seat back, leg rest and armrests simultaneously, wherein adjustment of the aircraft seat by the motor occurs through a single joint pivotally coupled to the mechanical linkage, a backbone linked to the motor, wherein the seat back is mounted to the backbone, and the motor is configured to recline the backbone at the single joint to engage the mechanical linkage; and a controller configured to send commands to the motor to adjust the seat by adjusting the mechanical linkage, wherein the motor, the mechanical linkage, and the single joint are configured to move the aircraft seat to a pre-defined seating position based on a selection received via the controller.

2. The adjustable aircraft seat of claim 1, wherein the base portions and the frame comprise a lightweight rigid material configured to prevent deformation of the aircraft seat when an occupant is seated.

3. The adjustable aircraft seat of claim 1, wherein a cushioned portion of the seat back comprises a relief configured to distribute pressure around an occupant's spine.

4. The adjustable aircraft seat of claim 1, wherein the cushioned portions comprise memory foam contoured to partially envelop an occupant seated within the aircraft seat.

5. The adjustable aircraft seat of claim 1, wherein the contoured seat components and the frame each possess left-right symmetry such that inboard and outboard portions of the aircraft seat are indistinguishable.

6. The adjustable aircraft seat of claim 1, wherein one of the pre-defined seating positions configures the seat into a position which supports a neutral body posture.

7. An adjustable aircraft seat comprising:

a plurality of contoured seat components including a seat bottom, a seat back, a leg rest, and armrests, wherein each component of the plurality comprises a cushioned portion mounted on a base portion;

a frame configured to support the seat bottom, seat back, leg rest, and armrests via each respective base portion;

a motor mounted on the frame;

a mechanical linkage operatively coupling the motor with components of the frame such that operation of the motor moves the seat bottom, seat back, leg rest and armrests simultaneously, wherein adjustment of the aircraft seat by the motor occurs through a single joint pivotally coupled to the mechanical linkage; and a backbone linked to the motor, wherein the seat back is mounted to the backbone, and the motor is configured to recline the backbone at the single joint to engage the mechanical linkage.

8. The adjustable aircraft seat of claim 7, wherein the base portions and the frame comprise a lightweight rigid material configured to prevent deformation of the aircraft seat when an occupant is seated.

9. The adjustable aircraft seat of claim 7, wherein a cushioned portion of the seat back comprises a relief configured to distribute pressure around an occupant's spine.

10. The adjustable aircraft seat of claim 7, wherein the cushioned portions comprise memory foam contoured to partially envelop an occupant seated within the aircraft seat.

11. The adjustable aircraft seat of claim 7, wherein the contoured seat components and the frame each possess left-right symmetry such that inboard and outboard portions of the aircraft seat are indistinguishable.

12. The adjustable aircraft seat of claim 7, comprising a controller configured to send commands to the motor to adjust the seat by adjusting the mechanical linkage.

13. The adjustable aircraft seat of claim 12, wherein the motor, the mechanical linkage, and the single joint are configured to move the aircraft seat to a pre-defined seating position based on a selection received via the controller.

14. The adjustable aircraft seat of claim 13, wherein one of the pre-defined seating positions configures the seat into a position which supports a neutral body posture.

* * * * *